US010632797B2

(12) United States Patent
Kubo

(10) Patent No.: US 10,632,797 B2
(45) Date of Patent: Apr. 28, 2020

(54) PNEUMATIC TIRE

(71) Applicant: TOYO TIRE & RUBBER CO., LTD., Osaka-shi, Osaka (JP)

(72) Inventor: Naoya Kubo, Osaka (JP)

(73) Assignee: TOYO TIRE CORPORATION, Osaka-shi (JP)

(*) Notice: Subject to any disclaimer, the term of this patent is extended or adjusted under 35 U.S.C. 154(b) by 583 days.

(21) Appl. No.: 15/292,627

(22) Filed: Oct. 13, 2016

(65) Prior Publication Data

US 2017/0106703 A1 Apr. 20, 2017

(30) Foreign Application Priority Data

Oct. 14, 2015 (JP) ................. 2015-203073

(51) Int. Cl.
*B60C 11/13* (2006.01)
*B60C 11/12* (2006.01)
*B60C 11/03* (2006.01)

(52) U.S. Cl.
CPC ...... *B60C 11/1307* (2013.01); *B60C 11/0304* (2013.01); *B60C 11/0309* (2013.01);
(Continued)

(58) Field of Classification Search
CPC .......... B60C 11/1281; B60C 11/1392; B60C 11/0304; B60C 11/1323; B60C 11/1307; B60C 11/1236; B60C 11/1218; B60C 11/125; B60C 11/0309; B60C 2011/0341; B60C 2011/0388; B60C 2011/0358; B60C 2011/0365; B60C 2011/0369; B60C 2011/0372
See application file for complete search history.

(56) References Cited

U.S. PATENT DOCUMENTS

| 5,240,053 A | * | 8/1993 | Baumhofer | ......... B60C 11/0306 |
| | | | | 152/209.22 |
| 2013/0199684 A1 | | 8/2013 | Sakamoto | |
| 2016/0152087 A1 | * | 6/2016 | Hayashi | ............. B60C 11/1392 |
| | | | | 152/209.18 |

FOREIGN PATENT DOCUMENTS

| DE | 3531047 A1 * | 3/1987 | ............. B60C 11/12 |
| DE | 102015202613 A1 * | 8/2016 | ......... B60C 11/1392 |

(Continued)

OTHER PUBLICATIONS

Machine translation of DE102015202613 (no date).*
(Continued)

*Primary Examiner* — Steven D Maki
*Assistant Examiner* — Philip N Schwartz
(74) *Attorney, Agent, or Firm* — Westerman, Hattori, Daniels & Adrian, LLP

(57) ABSTRACT

In a pneumatic tire according to one embodiment, at least one land portion provided on a tread portion includes a first lateral groove traversing the land portion, and a second lateral groove ending inside the land portion, these lateral grooves being arranged at intervals along a tire circumferential direction. A land portion section located between the first lateral groove and the second lateral groove includes a first inclined surface portion in a chamfered shape at an edge portion extending along the first lateral groove, a second inclined surface portion in a chamfered shape at an edge portion extending along the second lateral groove, and, at one edge portion in a tire width direction, a third inclined surface portion in a chamfered shape intervening between the first inclined surface portion and the second inclined surface portion to connect the two and extending along the tire circumferential direction.

11 Claims, 4 Drawing Sheets

(52) U.S. Cl.
CPC ........ *B60C 11/125* (2013.01); *B60C 11/1218* (2013.01); *B60C 11/1236* (2013.01); *B60C 11/1323* (2013.01); *B60C 11/1392* (2013.01); *B60C 11/1384* (2013.01); *B60C 2011/0341* (2013.01); *B60C 2011/0358* (2013.01); *B60C 2011/0365* (2013.01); *B60C 2011/0369* (2013.01); *B60C 2011/0372* (2013.01); *B60C 2011/0388* (2013.01)

(56) References Cited

FOREIGN PATENT DOCUMENTS

| | | | | | |
|---|---|---|---|---|---|
| JP | 01036505 | A | * | 2/1989 | ............. B60C 11/04 |
| JP | 02179508 | A | * | 7/1990 | ......... B60C 11/0309 |
| JP | 6-24213 | A | | 2/1994 | |
| JP | 2015-47977 | A | | 3/2015 | |
| WO | WO-2016128085 | A1 | * | 8/2016 | ......... B60C 11/1392 |

OTHER PUBLICATIONS

Machine translation of DE3531047 (no date).*
Machine translation of JP01-036505 (no date).*
Machine translation of JP02-179508 (no date).*
Office Action dated Mar. 20, 2019, issued in counterpart DE application No. 10 2016 219 967.6, with English translation. (13 pages).

* cited by examiner

PNEUMATIC TIRE

CROSS-REFERENCE TO RELATED APPLICATIONS

This application is based upon and claims the benefit of priority from the prior Japanese Patent Application No. 2015-203073, filed on Oct. 14, 2015; the entire contents of which are incorporated herein by reference.

BACKGROUND

1. Technical Field

Embodiments described herein relate to a pneumatic tire.

2. Related Art

In pneumatic tires, a tread pattern including a plurality of main grooves extending along a tire circumferential direction on a tread portion and a plurality of lateral grooves arranged at intervals along the tire circumferential direction at land portions partitioned with the main grooves is known. In the known tread pattern, blocks which are land portion sections partitioned with the lateral grooves, are arranged along the tire circumferential direction. For such pneumatic tires, there is a technique of providing an inclined surface portion formed in a chamfered shape at an edge portion extending along the lateral groove in each land portion section, so as to improve braking performance. This technique may contribute to an increase in the performance in the tire circumferential direction, such as braking performance, but may be unlikely to contribute to an increase in the performance in a tire width direction, such as handling performance.

JP-A-06-024213 discloses a technique aimed at improving the maximum value of cornering force while minimizing a decrease in cornering power. With this aim, in the discussed technique, an inclined surface portion in a chamfered shape is provided at each edge portion facing a vehicle outer side, from among edge portions surrounding each block-shaped land portion, and the length of each inclined surface portion along the tire width direction is made uniform. More specifically, in the technique discussed in JP-A-06-024213, an inclined surface portion is provided at each of two sides, including an edge portion extending along the tire circumferential direction and an edge portion extending along the tire width direction, of each block.

JP-A-2015-047977 discloses a configuration in which an inclined surface portion formed with a notch is provided at an edge portion extending along a narrow groove extending along the tire circumferential direction. In that configuration, in addition to the inclined surface portion extending along the tire circumferential direction, an inclined surface portion is also provided at an edge portion extending along the tire width direction, so that an inclined surface portion is provided at each of two side edge portions of each of land portion sections partitioned with the lateral grooves.

SUMMARY

In related art such as that described above, a sufficient advantageous effect cannot necessarily be obtained in terms of concurrently improving braking performance and handling performance, so that a further improvement is required.

Embodiments described herein have been developed in view of the above-mentioned points, and are directed to providing a pneumatic tire capable of concurrently improving braking performance and handling performance.

A pneumatic tire according to one embodiment includes a tread portion including a plurality of main grooves extending along a tire circumferential direction and a plurality of land portions partitioned with the main grooves, wherein at least one of the land portions includes a first lateral groove traversing the corresponding land portion and a second lateral groove extending from one edge portion of the corresponding land portion in a tire width direction and ending inside the corresponding land portion, the first lateral groove and the second lateral groove being arranged at intervals along the tire circumferential direction, and wherein a land portion section which is a section of each land portion located between the first lateral groove and the second lateral groove, includes a first inclined surface portion in a chamfered shape at an edge portion extending along the first lateral groove, a second inclined surface portion in a chamfered shape at an edge portion extending along the second lateral groove, and, at the one edge portion of the corresponding land portion in the tire width direction, a third inclined surface portion in a chamfered shape intervening between the first inclined surface portion and the second inclined surface portion to connect the first inclined surface portion and the second inclined surface portion and extending along the tire circumferential direction.

According to one embodiment, since an inclined surface portion in a chamfered shape is provided at each of three side edge portions of a land portion section located between a first lateral groove and a second lateral groove, braking performance and handling performance can be concurrently improved.

DESCRIPTION OF THE EMBODIMENTS

Hereinafter, embodiments will be described with reference to the drawings.

A pneumatic tire according to one embodiment is configured to include a pair of right and left bead portions and a pair of right and left side wall portions, which are not illustrated, and a tread portion 10 provided between the right and left side wall portions to connect the outer peripheral ends of the right and left side wall portions, and can employ a usual tire structure except a tread pattern.

Figure 1:
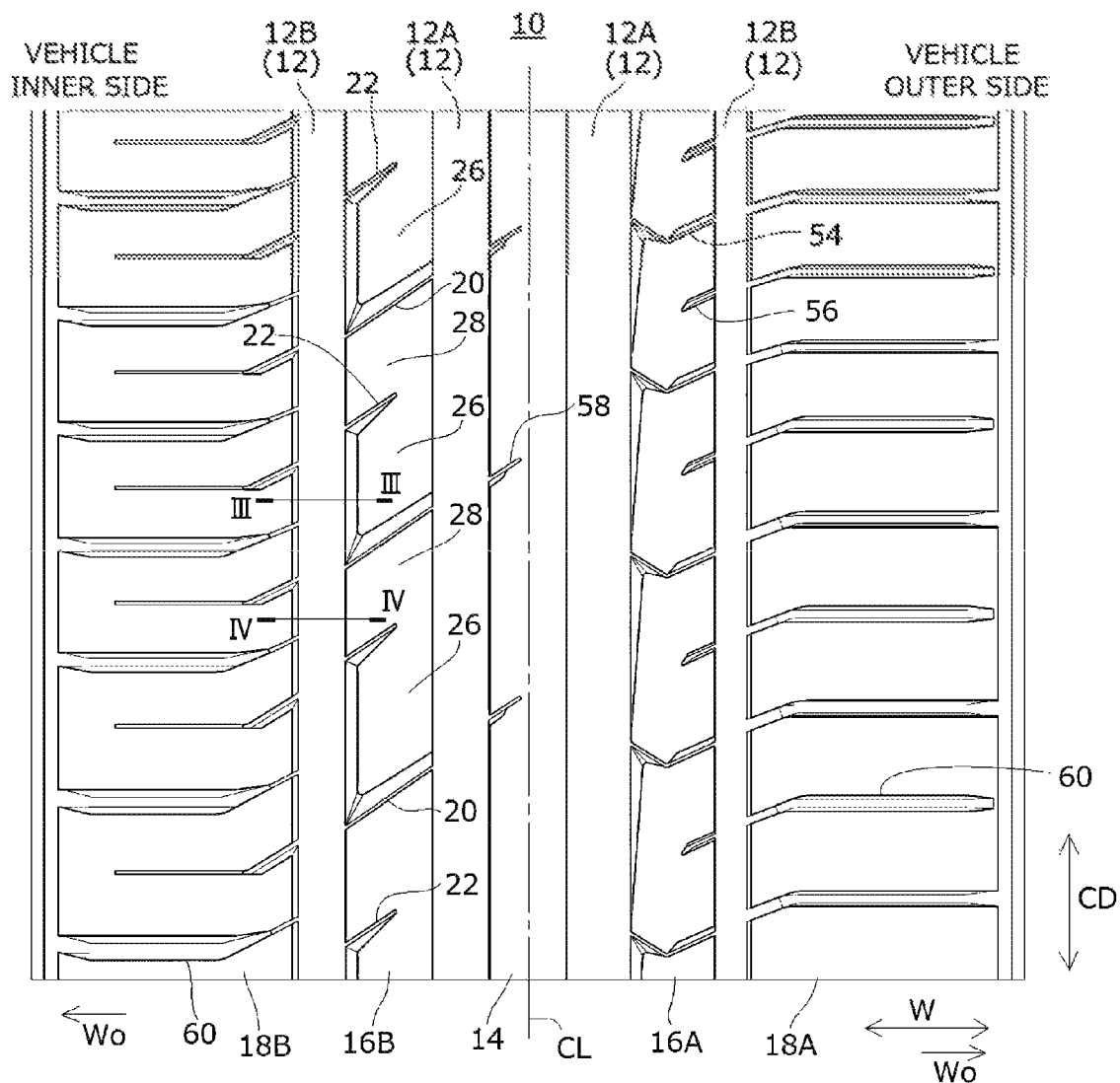
FIG. 1 is a developed view illustrating a tread pattern of a pneumatic tire according to an embodiment.

A plurality of main grooves 12 in a straight shape extending along a tire circumferential direction CD is provided on the surface of the tread portion 10, as illustrated in FIG. 1. In this example, four main grooves 12 are provided, which, more specifically, include a pair of central main grooves 12A and 12A arranged on both sides across a tire equator CL and a pair of shoulder main grooves 12B and 12B arranged on the respective tire-width-direction outer sides Wo relative to the pair of central main grooves 12A and 12A. Here, the term "tire width direction" refers to directions parallel to the tire rotation axis, which are indicated by reference character W in FIG. 1. Moreover, the term "tire circumferential direction" refers to directions on the circumference of a circle centering on the tire rotation axis, which are indicated by reference character CD in FIG. 1. The term "tire-width-direction outer sides Wo" refers to sides farther from the tire equator CL along the tire width direction W. The tire equator CL corresponds to the center of the width of the tire as viewed along the tire width direction W.

A plurality of land portions is formed on the tread portion 10 and is partitioned with the main grooves 12. More specifically, the plurality of land portions formed on the tread portion 10 includes a central land portion 14, which is formed between the pair of right and left central main grooves 12A and 12A, a pair of right and left intermediate land portions 16A and 16B, each of which is formed between the central main groove 12A and the shoulder main groove 12B, and a pair of right and left shoulder land portions 18A and 18B, which are formed on the respective tire-width-direction outer sides Wo relative to the pair of right and left shoulder main grooves 12B and 12B.

Here, the pneumatic tire according to the present embodiment is a tire in which the outer side and inner side thereof as viewed when a wheel with the tire fixed thereto is mounted on a vehicle are prespecified. In other words, the surface of the tire facing the vehicle inner side and the surface of the tire facing the vehicle outer side as viewed when the tire is mounted on a vehicle are predetermined. As illustrated in FIG. 1, the tread pattern is asymmetrical with respect to the tire equator CL, and is set such that the right-hand side thereof is located on the vehicle outer side in the vehicle-mounted attitude and the left-hand side thereof is located on the vehicle inner side in the vehicle-mounted attitude.

In the present embodiment, the intermediate land portion 16B, which is located on the vehicle inner side, has a characteristic configuration. The intermediate land portion 16B, which is a rib-shaped land portion extending along the tire circumferential direction CD, includes first lateral grooves 20, which traverse the intermediate land portion 16B, and second lateral grooves 22, which end inside the intermediate land portion 16B, and the first lateral grooves 20 and the second lateral grooves 22 are arranged at intervals along the tire circumferential direction CD. In this example, the first lateral grooves 20 and the second lateral grooves 22 are alternately arranged one by one along the tire circumferential direction CD.

Figure 2:
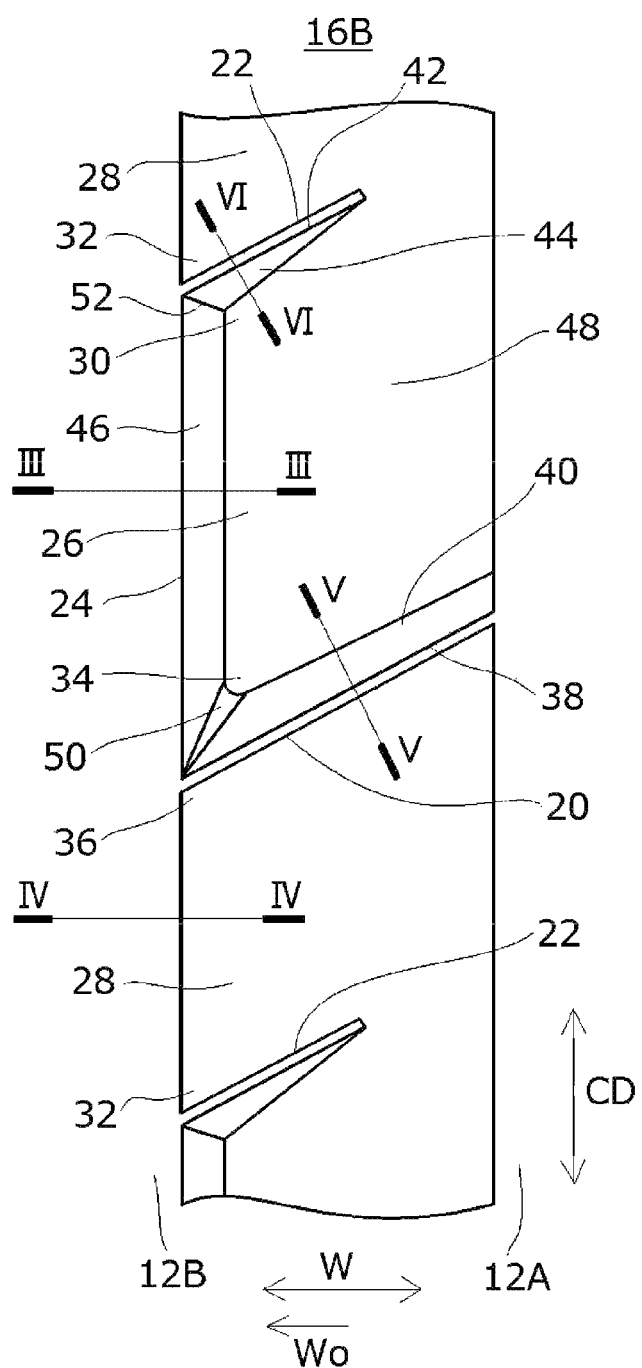
FIG. 2 is an enlarged plan view illustrating a principal portion of a tread portion of the pneumatic tire.

As illustrated in enlarged view in FIG. 2, the first lateral groove 20 is a narrow groove in a pass-through shape (a pass-through lateral groove) that completely segments the intermediate land portion 16B, and is formed in a straight-line manner. The first lateral groove 20 extends while being inclined relative to the tire width direction W.

The second lateral groove 22 is a narrow groove in a non-pass-through shape (a non-pass-through lateral groove) that ends halfway through the intermediate land portion 16B without traversing the intermediate land portion 16B. The second lateral groove 22 extends along the tire width direction W from one edge portion 24 in the tire width direction W of the intermediate land portion 16B and ends inside the intermediate land portion 16B. In this example, the second lateral groove 22 extends from the edge portion 24 on the tire-width-direction outer side Wo (the vehicle inner side) in the intermediate land portion 16B toward the tire equator CL in a straight-line manner, and ends at a middle portion in the tire width direction W of the intermediate land portion 16B. Thus, the second lateral groove 22 is arranged to open into the main groove 12 (in this example, the shoulder main groove 12B) at the edge portion 24. The second lateral groove 22 extends while being inclined relative to the tire width direction W, so that, in this example, the first lateral groove 20 and the second lateral groove 22 are arranged in parallel with each other.

While the groove widths of the first lateral groove 20 and the second lateral groove 22 are not specifically limited, it is desired that, to improve driving stability and straight-running stability with the intermediate land portion 16B serving as a rib base, the first lateral groove 20 and the second lateral groove 22 be sipes. More specifically, it is desirable that the groove widths of the first lateral groove 20 and the second lateral groove 22 be set to such widths as to allow the opposite walls of each of the first lateral groove 20 and the second lateral groove 22 to come into contact with each other when the tire, which is mounted on a regular rim and is filled with a regular inner pressure, is vertically placed on the flat road surface and is held in a ground contact state with a regular load applied thereto. For example, each of the groove width g1 (refer to FIG. 5) of the first lateral groove 20 and the groove width g2 (refer to FIG. 6) of the second lateral groove 22 can be from 0.1 mm to 1.5 mm, inclusive, from 0.2 mm to 1.0 mm, inclusive, or from 0.3 mm to 0.8 mm, inclusive. Furthermore, the groove depth h0 (refer to FIGS. 5 and 6) of the lateral grooves 20 and 22 is not specifically limited, and can be, for example, from 5.0 mm to 10.0 mm, inclusive, or from 6.0 mm to 8.5 mm, inclusive.

Here, the regular rim is a rim specified for each tire by a standard based on which tires are specified in a standard system including the standard, and is, for example, a "Standard Rim" in the JATMA standard, a "Design Rim" in the TRA standard, or a "Measuring Rim" in the ETRTO standard. The regular inner pressure is an air pressure specified for each tire by a standard based on which tires are specified in a standard system including the standard, and is, for example, "maximum air pressure" in the JATMA standard, "maximum value" described in the table "TIRE LOAD LIMITS AT VARIOUS COLD INFLATION PRESSURES" in the TRA standard, or "INFLATION PRESSURE" in the ETRTO standard. Furthermore, the regular load is a load specified for each tire by a standard based on which tires are specified in a standard system including the standard, and is, for example, "maximum load capability" in the JATMA standard, "maximum value" described in the above-mentioned table in the TRA standard, or "LOAD CAPACITY" in the ETRTO standard, but is supposed to be a load corresponding to 88% of each of the above-mentioned loads when the tire is the one used for passenger cars. Moreover, hereinafter, unless otherwise mentioned, the dimensions of various portions of the tire are supposed to be values measured under an unloaded condition in which the tire is mounted on the regular rim and is filled with the regular inner pressure.

The intermediate land portion 16B includes land portion sections 26 and 28, each of which is a block section located between the first lateral groove 20 and the second lateral groove 22. Each of the land portion sections 26 and 28 is a region obtained by partitioning the intermediate land portion 16B with the first lateral grooves 20 and the second lateral grooves 22 along the tire circumferential direction CD. Since the first lateral grooves 20 and the second lateral grooves 22 are provided while being inclined relative to the tire width direction W as mentioned in the forgoing, in this example, the intermediate land portion 16B includes first land portion sections 26, each of which contains an obtuse corner portion 30 the angle of which made between the second lateral groove 22 and the shoulder main groove 12B with which the second lateral groove 22 communicates is obtuse, and second land portion sections 28, each of which contains an acute corner portion 32 the angle of which made between the second lateral groove 22 and the shoulder main groove 12B is acute. Accordingly, each of the first land portion sections 26 includes an acute corner portion 34 the angle of which made between the first lateral groove 20 and the shoulder main groove 12B is acute and the above-mentioned obtuse corner portion 30. Moreover, each of the second land portion sections 28 includes an obtuse corner portion 36 the angle of which made between the first lateral groove 20 and the shoulder main groove 12B is obtuse and the above-mentioned acute corner portion 32.

As illustrated in FIG. 2, the first land portion section 26 is provided with inclined surfaces (tapering) at edge portions of three sides thereof. Thus, the first land portion section 26 is provided with a first inclined surface portion 40 in a chamfered shape at an edge portion 38 extending along the first lateral groove 20 and a second inclined surface portion 44 in a chamfered shape at an edge portion 42 extending along the second lateral groove 22. Moreover, the first land portion section 26 is further provided with a third inclined surface portion 46 in a chamfered shape intervening between the first inclined surface portion 40 and the second inclined surface portion 44 and connecting the two, at the above-mentioned one edge portion 24 in the tire width direction W of the first land portion section 26.

Figure 5:
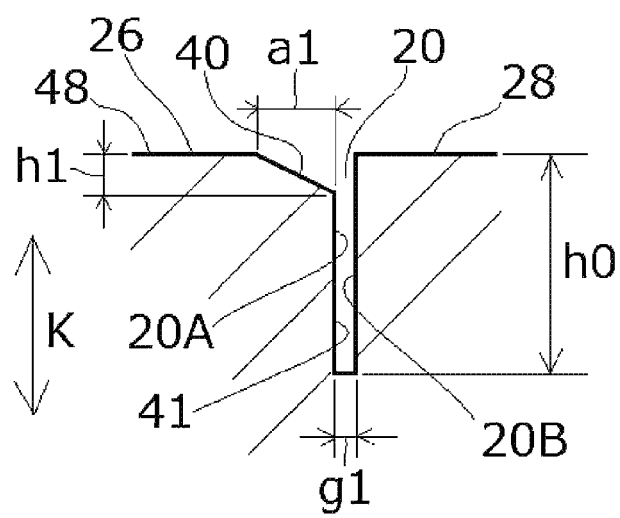
FIG. 5 is a cross-sectional view taken along line V-V in FIG. 2.

The first inclined surface portion 40 is an inclined surface portion extending while being inclined relative to the tire width direction W along the first lateral groove 20, which traverses the intermediate land portion 16B, and formed over the entire width of the intermediate land portion 16B. As illustrated in FIG. 5, the first inclined surface portion 40 is a planar inclined surface portion obtained by obliquely cutting away a corner portion in an end portion opening to a tire ground contact area 48 of the first lateral groove 20, and is inclined in such a way as to increase the groove width of the first lateral groove 20 toward the tire ground contact area 48. The first inclined surface portion 40 is provided on one groove wall 20A, from among a pair of groove walls of the first lateral groove 20, and no inclined surface portion is provided on the other groove wall 20B. The one groove wall 20A includes the first inclined surface portion 40, which is provided at the end portion opening to the tire ground contact area 48, and a main wall surface portion 41 extending along a tire radial direction K from the lower end of the first inclined surface portion 40 to the groove bottom. Here, the term "tire radial direction K" refers to a direction perpendicular to the tire rotation axis.

The height h1 and the width a1 of the first inclined surface portion 40 are not specifically limited, and, for example, the maximum height h1 can be 2.0 mm or less, or from 1.0 mm to 2.0 mm, inclusive. The maximum width a1 can be 6.0 mm or less, or from 1.5 mm to 5.0 mm, inclusive. Moreover, in this example, the width of the first inclined surface portion 40 is formed in such a way as to slightly increase when coming closer to the third inclined surface portion 46.

The second inclined surface portion 44 is an inclined surface portion extending while being inclined relative to the tire width direction W along the second lateral groove 22, which ends inside the intermediate land portion 16B, and is formed over the entirety of the second lateral groove 22 along the extending direction. Therefore, the second inclined surface portion 44 is provided not at the full width of the intermediate land portion 16B but at approximately half of the tire-width-direction outer sides Wo.

Figure 6:
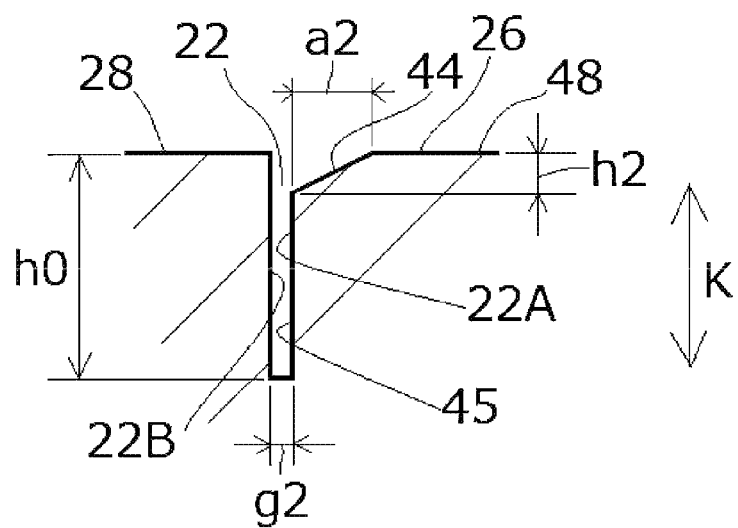
FIG. 6 is a cross-sectional view taken along line VI-VI in FIG. 2.

As illustrated in FIG. 6, the second inclined surface portion 44 is a planar inclined surface portion obtained by obliquely cutting away a corner portion in an end portion opening to the tire ground contact area 48 of the second lateral groove 22, and is inclined in such a way as to increase the groove width of the second lateral groove 22 toward the tire ground contact area 48. The second inclined surface portion 44 is provided on one groove wall 22A, from among a pair of groove walls of the second lateral groove 22, and no inclined surface portion is provided on the other groove wall 22B. The one groove wall 22A includes the second inclined surface portion 44, which is provided at the end portion opening to the tire ground contact area 48, and a main wall surface portion 45 extending along the tire radial direction K from the lower end of the second inclined surface portion 44 to the groove bottom.

The height h2 and the width a2 of the second inclined surface portion 44 are not specifically limited, and, for example, the maximum height h2 can be 2.0 mm or less, or from 1.0 mm to 2.0 mm, inclusive. The maximum width a2 can be 5.0 mm or less, or from 1.5 mm to 4.0 mm, inclusive. Moreover, although the width of the second inclined surface portion 44 can be constant in the extending direction of the second lateral groove 22, in this example, the width of the second inclined surface portion 44 is formed in such a way as to decrease gradually from the end portion opening to the shoulder main groove 12B toward the end of the second lateral groove 22.

The third inclined surface portion 46 is an inclined surface portion formed over the entirety of the edge portion 24 of the first land portion section 26 and extending along the tire circumferential direction CD, and has one end in the tire circumferential direction CD connected to the first inclined surface portion 40 and the other end in the tire circumferential direction CD connected to the second inclined surface portion 44. Accordingly, the first inclined surface portion 40, the third inclined surface portion 46, and the second inclined surface portion 44 are formed as an inclined surface portion continuous over the three sides of the first land portion section 26.

Figure 3:
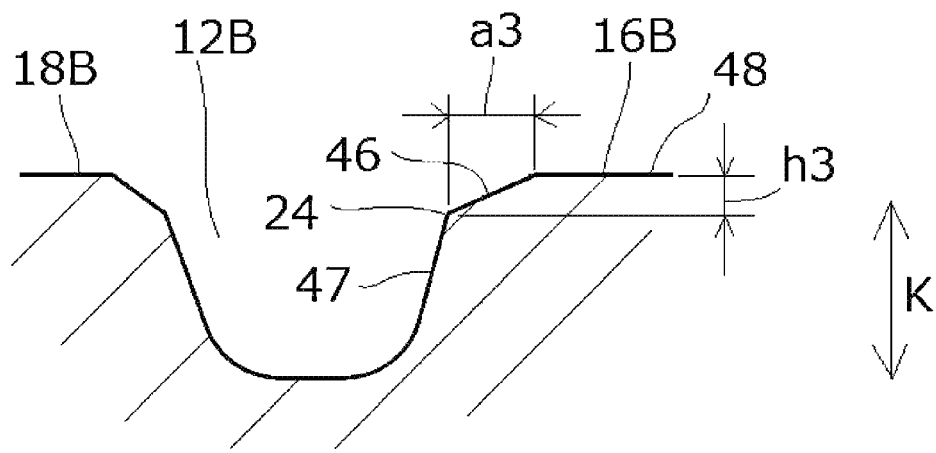
FIG. 3 is a cross-sectional view taken along line in FIG. 1.

As illustrated in FIG. 3, the third inclined surface portion 46 is a planar inclined surface portion obtained by obliquely cutting away a corner portion in an end portion opening to the tire ground contact area 48 of the shoulder main groove 12B defining the edge portion 24, and is inclined in such a way as to increase the groove width of the shoulder main groove 12B toward the side of the tire ground contact area 48. Thus, the wall surface on the side of the intermediate land portion 16B of the shoulder main groove 12B includes a main wall surface portion 47, which extends upward from the groove bottom toward the outer side in the tire radial direction K, and the third inclined surface portion 46, which extends from the upper end of the main wall surface portion 47 to the tire ground contact area 48. The height h3 and the width a3 of the third inclined surface portion 46 are not specifically limited, and, for example, the maximum height h3 can be 2.0 mm or less, or from 1.0 mm to 2.0 mm, inclusive. The maximum width a3 can be 6.0 mm or less, or from 1.5 mm to 5.0 mm, inclusive. Moreover, in this example, the width of the third inclined surface portion 46 is formed to be constant in the tire circumferential direction CD.

As illustrated in FIG. 2, a connection portion 50 connecting the first inclined surface portion 40 and the third inclined surface portion 46 is provided at the acute corner portion 34 the angle of which made between the first lateral groove 20 and the shoulder main groove 12B is acute. The connection portion 50 provided at the acute corner portion 34 is composed of a curved surface portion intervening between the planer first inclined surface portion 40 and the planar third inclined surface portion 46 and connecting the two. Thus, the first inclined surface portion 40 and the third inclined surface portion 46 are connected by the connection portion 50 in a curved surface shape the horizontal cross-section (the cross-section perpendicular to the tire radial direction K) of which is arc-like. The connection portion 50 in such a curved surface shape is formed in such a way as to gradually increase the width thereof from the lower end of the first inclined surface portion 40 and the third inclined surface portion 46 (the inner side end in the tire radial direction K) toward the tire ground contact area 48.

On the other hand, a connection portion 52 connecting the second inclined surface portion 44 and the third inclined surface portion 46 is provided at the obtuse corner portion 30 the angle of which made between the second lateral groove 22 and the shoulder main groove 12B is obtuse. The connection portion 52 provided at the obtuse corner portion 30 is composed of a ridge line, so that the planer second inclined surface portion 44 and the planar third inclined surface portion 46 are connected by a joining portion in a straight-line shape.

Figure 4:
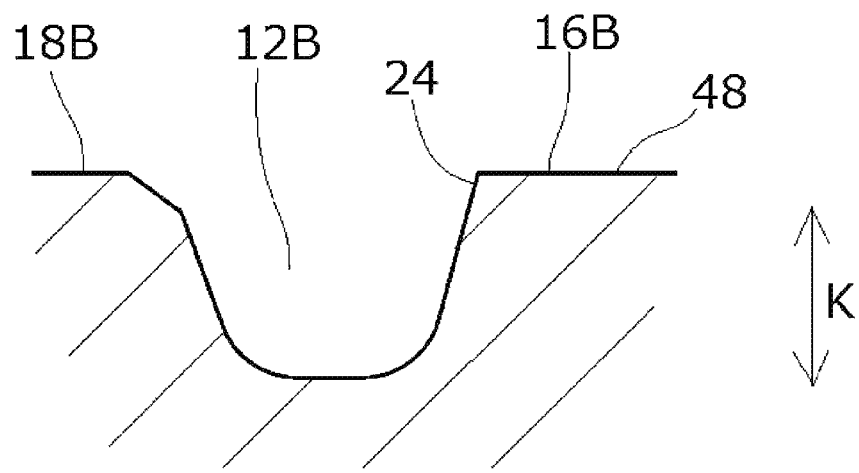
FIG. 4 is a cross-sectional view taken along line IV-IV in FIG. 1.

While the first land portion section 26 is provided with the inclined surface portions 40, 44, and 46 continuous at three sides, as described above, the second land portion section 28, which is located adjacent to the first land portion section 26, is not provided with such inclined surface portions 40, 44, and 46. Thus, in the second land portion section 28, as illustrated in FIG. 5, no inclined surface portion is provided on the above-mentioned other groove wall 20B, which is an edge portion extending along the first lateral groove 20. Moreover, as illustrated in FIG. 6, no inclined surface portion is provided on the above-mentioned other groove wall 22B, which is an edge portion extending along the second lateral groove 22. Additionally, as illustrated in FIG. 4, no inclined surface portion in a chamfered shape is provided on the edge portion 24 extending along the shoulder main groove 12B. Accordingly, as illustrated in FIG. 1, the first land portion sections 26, each of which includes the first to third inclined surface portions 40, 44, and 46, and the second land portion sections 28, each of which does not include such inclined surface portions, are alternately arranged one by one along the tire circumferential direction CD on the intermediate land portion 16B.

Configurations of land portions other than the intermediate land portion 16B located at the vehicle inner side are briefly described according to the embodiment illustrated in FIG. 1. The intermediate land portion 16A located at the vehicle outer side is provided with L-shaped lateral grooves 54 traversing the intermediate land portion 16A, and non-pass-through lateral grooves 56, the L-shaped lateral grooves 54 and the non-pass-through lateral grooves 56 being alternately arranged one by one along the tire circumferential direction CD. The central land portion 14 is provided with non-pass-through lateral grooves 58 arranged at intervals along the tire circumferential direction CD and is provided with no lateral grooves that traverse the central land portion 14. The pair of right and left shoulder land portions 18A and 18B is provided with a plurality of lateral grooves 60 traversing the land portions 18A and 18B and arranged at intervals along the tire circumferential direction CD.

According to the above-described embodiment, since, in the intermediate land portion 16B, the first to third inclined surface portions 40, 44, and 46 in a chamfered shape are provided in a continuous shape on the three side edge portions 24, 38, and 42 of the first land portion section 26 located between the first lateral groove 20 and the second lateral groove 22, braking performance and handling performance can be concurrently improved.

More specifically, since the first and second inclined surface portions 40 and 44 extending along the tire width direction W are provided along the first lateral groove 20 and the second lateral groove 22, the ground contact pressure at both the end portions in the tire circumferential direction CD of the first land portion section 26 can be reduced to uniform the ground contact pressure inside the first land portion section 26, so that braking performance can be improved. Moreover, since the third inclined surface portion 46 extending along the tire circumferential direction CD is additionally provided, the ground contact pressure at the end portion in the tire width direction W of the first land portion section 26 can be optimized, so that the traction performance under the action of lateral force (cornering force) can be improved and, thus, handling performance can also be improved. Additionally, since such inclined surface portions are provided not at all of the sides of the first land portion section 26 but at the above-mentioned three sides thereof, braking performance and handling performance can be improved while a sufficient ground contact area is ensured.

Furthermore, according to the embodiment, since the first lateral groove 20 traversing the intermediate land portion 16B, and the non-pass-through second lateral groove 22 which does not traverse the intermediate land portion 16B, are alternately arranged one by one along the tire circumferential direction CD, drainage performance can be improved while the stiffness of the intermediate land portion 16B is maintained.

Moreover, since the first inclined surface portion 40 and the second inclined surface portion 44 are provided on the first lateral groove 20 and the second lateral groove 22, respectively, the ground contact pressure at the two ends along the tire circumferential direction CD of the first land portion section 26 can be optimized, so that drainage performance can be improved. Such an increase in drainage performance can enhance the effect of improvement in braking performance and handling performance on a wet road surface.

According to the embodiment, additionally, since the first land portion section 26, which is provided with the first to third inclined surface portions 40, 44, and 46, and the second land portion section 28, which is provided with no such inclined surface portions, are alternately arranged one by one along the tire circumferential direction CD, drainage performance can be improved and traction performance can be improved without any decrease of the ground contact area, so that the effect of satisfying both of braking performance and handling performance can be enhanced.

According to the embodiment, furthermore, since the connection portion 50, which is provided at the acute corner portion 34 of the first land portion section 26 and connects the first inclined surface portion 40 and the third inclined surface portion 46, is composed of a curved surface portion, any decrease in stiffness at the acute corner portion 34 can be reduced.

Additionally, since the connection portion 52, which is provided at the obtuse corner portion 30 of the first land portion section 26 and connects the second inclined surface portion 44 and the third inclined surface portion 46, is composed of a ridge line, any decrease in traction performance can be reduced. In other words, since the obtuse corner portion 30 is higher in stiffness than an acute corner portion, a connection portion does not have to be formed into a curved surface shape in consideration of a decrease in stiffness, but can be composed of a ridge line, so that the ground contact area can be increased as much as a difference in area between the curved surface shape and the ridge line, thus leading to an improvement in traction performance.

Furthermore, while, in the embodiment, a structure in which the inclined surface portions 40, 44, and 46, which are continuous at the above-mentioned three sides, are provided at the intermediate land portion 16B on the vehicle inner side is employed, such a structure can be employed for another land portion and, thus, only needs to be employed for at least one land portion.

Moreover, while, in the embodiment, an example has been described in which the first lateral groove 20 and the second lateral groove 22 are alternately arranged one by one along the tire circumferential direction CD, the first lateral groove 20 and the second lateral groove 22 do not need to be alternately arranged one by one along the tire circumferential direction CD. Additionally, while an example has been described in which the first land portion section 26 and the second land portion section 28 are alternately arranged one by one along the tire circumferential direction CD, this is not limiting, but, for example, the inclined surface portions 40, 44, and 46, which are continuous at the above-mentioned three sides, can be provided at all of the land portion sections 26 and 28.

Example

For the purpose of showing an advantageous effect of the above-described embodiment, pneumatic radial tires (size: 225/50R17) for passenger cars of Example 1 and Comparative Examples 1 to 3 were produced by way of trial. The tire of Example 1 is a tire described in the embodiment illustrated in FIGS. 1 to 6 (the depth of the shoulder main groove=7.2 mm, h0=7.2 mm, g1=g2=0.8 mm, h1=1.5 mm (maximal portion), a1=5.0 mm (maximal portion), h2=1.5 mm (maximal portion), a2=3.0 mm (maximal portion), h3=1.5 mm, and a3=5.0 mm). Comparative Example 1 is an example in which, in the configuration of Example 1, only the first inclined surface portion 40 is provided while the second inclined surface portion 44 and the third inclined surface portion 46 are not provided. Comparative Example 2 is an example in which, in the configuration of Example 1, only the third inclined surface portion 46 is provided while the first inclined surface portion 40 and the second inclined surface portion 44 are not provided. Comparative Example 3 is an example in which, in the configuration of Example 1, the first inclined surface portion 40 and the third inclined surface portion 46 are provided while the second inclined surface portion 44 is not provided. In these examples, the other constituent elements were configured in the same manner.

Each of these tires, which was mounted on a regular rim and was filled with air at an inner pressure of 220 kPa, was mounted on a vehicle, and braking performance and handling performance on a wet road surface were evaluated. Each evaluation method is as follows.

Braking Performance: Under the condition that a vehicle with each trial tire mounted thereon was caused to run on the road surface of water film of 1 mm in thickness as a wet road surface, full braking from 100 km/h to 0 km/h was performed, and the reciprocal of the obtained braking distance was expressed as an index with the value obtained in Comparative Example 1 taken as 100. The larger index indicates that the braking distance is shorter and the braking performance on a wet road surface is superior.

Handling Performance: Under the condition that a vehicle with each trial tire mounted thereon was caused to run on the road surface of water film of 1 mm in thickness as a wet road surface and run straight ahead at 60 km/h to 140 km/h, lane change and slalom maneuvers were conducted, sensory evaluation was performed, a lap time was also measured, and, then, handling performance was evaluated in a comprehensive manner. The evaluation result was expressed as an index with the result obtained in Comparative Example 1 taken as 100, and the larger index indicates that the handling performance on a wet road surface is superior.

TABLE 1

|  | Comparative Example 1 | Comparative Example 2 | Comparative Example 3 | Example 1 |
|---|---|---|---|---|
| First Inclined Surface Portion 40 | Provided | Not Provided | Provided | Provided |
| Second Inclined Surface Portion 44 | Not Provided | Not Provided | Not Provided | Provided |
| Third Inclined Surface Portion 46 | Not Provided | Provided | Provided | Provided |
| Braking Performance | 100 | 99 | 100 | 101 |
| Handling Performance | 100 | 101 | 101 | 102 |

The result is set forth in Table 1 above. As compared with Comparative Example 1, in which the first inclined surface portion 40 extending along the tire width direction was provided, Comparative Example 2, in which the third inclined surface portion 46 extending along the tire circumferential direction was provided instead of the first inclined surface portion 40, exhibited an increased handling performance but exhibited a decreased braking performance. As compared with Comparative Example 1, Comparative Example 3, in which the third inclined surface portion 46 extending along the tire circumferential direction was added, exhibited an improved handling performance but exhibited an unimproved braking performance. On the other hand, as compared with Comparative Example 1, in which only the first inclined surface portion 40 was provided, Example 1, in which the first to third inclined surface portions 40, 44, and 46 continuous at the three edge portions were provided, not only exhibited an improved braking performance but also exhibited a significantly improved handling performance.

While some embodiments have been described above, these embodiments are only intended for illustration, and are not intended to limit the scope of the invention. These novel embodiments can be implemented in other various forms and modes, and can be subjected to various omissions, replacements, and modifications without any departure from the gist of the invention.

What is claimed is:

1. A pneumatic tire comprising a tread portion including a plurality of main grooves extending along a tire circumferential direction and a plurality of land portions partitioned with the main grooves,
   wherein at least one of the land portions includes a first lateral groove traversing the corresponding land portion and a second lateral groove extending from one edge portion of the corresponding land portion in a tire width direction and ending inside the corresponding land portion, the first lateral groove and the second lateral groove being arranged at intervals along the tire circumferential direction, and
   wherein a land portion section which is a section of each land portion located between the first lateral groove and the second lateral groove, includes;
   a first inclined surface portion in a chamfered shape at an edge portion extending along the first lateral groove,
   a second inclined surface portion in a chamfered shape at an edge portion extending along the second lateral groove,
   at the one edge portion of the corresponding land portion in the tire width direction, a third inclined surface portion in a chamfered shape intervening between the first inclined surface portion and the second inclined surface portion to connect the first inclined surface portion and the second inclined surface portion and extending along the tire circumferential direction,
   wherein the at least one of the land portions includes the first lateral groove and the second lateral groove alternately arranged along the tire circumferential direction, and further includes;
   a first land portion section which is a land portion section located between the first lateral groove and the second lateral groove and includes the first inclined surface portion, the second inclined surface portion, and the third inclined surface portion, and
   a second land portion section which is a land portion section located between the first lateral groove and the second lateral groove and includes none of the first to third inclined surface portions, the first land portion section and the second land portion section being alternately arranged along the tire circumferential direction.

2. The pneumatic tire according to claim 1, wherein the first lateral groove and the second lateral groove are sipes.

3. The pneumatic tire according to claim 1, wherein the first lateral groove and the second lateral groove extend while being inclined relative to the tire width direction,
   wherein the land portion section includes an acute corner portion an angle of which made between the first lateral groove and the main groove is acute, and an obtuse corner portion an angle of which made between the second lateral groove and the main groove is obtuse, and
   wherein a first connection portion connecting the first inclined surface portion and the third inclined surface portion is provided at the acute corner portion, and a second connection portion connecting the second inclined surface portion and the third inclined surface portion is provided at the obtuse corner portion.

4. The pneumatic tire according to claim 3, wherein the first connection portion provided at the acute corner portion is formed of a curved surface portion connecting the first inclined surface portion and the third inclined surface portion.

5. The pneumatic tire according to claim 3, wherein the second connection portion provided at the obtuse corner portion is formed of a ridge line.

6. The pneumatic tire according to claim 1, wherein a maximum height of the first inclined surface portion is 2.0 mm or less, a maximum width of the first inclined surface portion is 6.0 mm or less, a maximum height of the second inclined surface portion is 2.0 mm or less, a maximum width of the second inclined surface portion is 5.0 mm or less, a maximum height of the third inclined surface portion is 2.0 mm or less, and a maximum width of the third inclined surface portion is 6.0 mm or less.

7. The pneumatic tire according to claim 1, wherein the pneumatic tire is a tire in which a surface thereof facing a vehicle inner side and a surface thereof facing a vehicle outer side as viewed when the tire is mounted on a vehicle are prespecified,
   wherein the plurality of main grooves includes a pair of central main grooves, and a pair of shoulder main grooves located respectively outside in the tire width direction of the pair of central main grooves,
   wherein the plurality of land portions includes a central land portion formed between the pair of central main grooves, a pair of intermediate land portions formed between the central main groove and the shoulder main groove, and a pair of shoulder land portions formed outside in the tire width direction of the shoulder main groove, and
   wherein the land portion including the first lateral groove and the second lateral groove is the intermediate land portion located on the vehicle inner side.

8. The pneumatic tire according to claim 1, wherein the first lateral groove and the second lateral groove are formed in a straight-line.

9. The pneumatic tire according to claim 8, wherein the first lateral groove and the second lateral groove are inclined relative to the tire width direction.

10. The pneumatic tire according to claim 2, wherein the first lateral groove and the second lateral groove are formed in a straight-line and are inclined relative to the tire width direction.

11. The pneumatic tire according to claim 4, wherein the first connection portion is arc-like in a horizontal cross-section, and is formed in such a way as to increase a width thereof from lower ends of the first inclined surface portion and the third inclined surface portion toward a tire ground contact area.

* * * * *